(12) United States Patent
Iwasaki

(10) Patent No.: US 9,727,126 B2
(45) Date of Patent: Aug. 8, 2017

(54) METHOD FOR MANUFACTURING TOUCH PANEL

(71) Applicant: FUJITSU COMPONENT LIMITED, Tokyo (JP)

(72) Inventor: Nobuya Iwasaki, Tokyo (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 137 days.

(21) Appl. No.: 14/454,838

(22) Filed: Aug. 8, 2014

(65) Prior Publication Data

US 2015/0047778 A1 Feb. 19, 2015

(30) Foreign Application Priority Data

Aug. 13, 2013 (JP) ................................. 2013-168299

(51) Int. Cl.
| | |
|---|---|
| *B32B 37/12* | (2006.01) |
| *G06F 3/00* | (2006.01) |
| *G06F 3/044* | (2006.01) |
| *G06F 3/045* | (2006.01) |
| *B32B 38/00* | (2006.01) |

(52) U.S. Cl.
CPC ................ *G06F 3/00* (2013.01); *B32B 37/12* (2013.01); *G06F 3/044* (2013.01); *G06F 3/045* (2013.01); *B32B 2037/1253* (2013.01); *B32B 2038/0076* (2013.01); *B32B 2457/208* (2013.01)

(58) Field of Classification Search
CPC ............................. B32B 37/12; B32B 38/0008
See application file for complete search history.

(56) References Cited

U.S. PATENT DOCUMENTS

| | | | | |
|---|---|---|---|---|
| 2012/0026102 A1* | 2/2012 | Chang | ..................... | G06F 3/041 345/173 |
| 2012/0325402 A1* | 12/2012 | Suwa | ................... | B32B 37/1207 156/275.5 |
| 2013/0029075 A1* | 1/2013 | Niiyama | ........... | G02F 1/133308 428/41.7 |
| 2014/0069581 A1* | 3/2014 | Ogawa | ................... | G02F 1/1303 156/275.5 |
| 2014/0256842 A1 | 9/2014 | Kobayashi et al. | | |

FOREIGN PATENT DOCUMENTS

| | | | | |
|---|---|---|---|---|
| JP | 2001356312 A | * | 12/2001 | |
| JP | 2012-73533 | | 4/2012 | |
| JP | 2012-98973 | | 5/2012 | |
| JP | WO 2012099171 A1 | * | 7/2012 | ................ C09J 4/00 |
| JP | 2012-203514 | | 10/2012 | |
| JP | 2013-130894 | | 7/2013 | |
| JP | WO 2013111810 A1 | * | 8/2013 | ........... G02F 1/1303 |
| WO | 2013/057959 | | 4/2013 | |

* cited by examiner

*Primary Examiner* — Daniel McNally
(74) *Attorney, Agent, or Firm* — IPUSA, PLLC

(57) ABSTRACT

A method for manufacturing a touch panel that includes applying a UV (ultraviolet) curing resin on a surface of a decorative film, forming a peripheral curing area by curing a peripheral area of the decorative film by radiating a UV light thereto, placing a touch panel body on the UV curing resin after the forming of the peripheral curing area, and forming an inner curing area by curing the UV curing resin by radiating the UV light thereto and adhering the decorative film and the touch panel body to each other at the inner curing area.

7 Claims, 4 Drawing Sheets

METHOD FOR MANUFACTURING TOUCH PANEL

CROSS-REFERENCE TO RELATED APPLICATIONS

This application is based upon and claims the benefit of priority of the Japanese Patent Application No. 2013-168299 filed on Aug. 13, 2013, the entire contents of which are incorporated herein by reference.

FIELD

The embodiments discussed herein are related to a method for manufacturing a touch panel.

BACKGROUND

A touch panel is an input device that allows input to be performed directly on a display. The touch panel is often used by being placed at the front of a display. Because input can be performed directly on the touch panel based on data that is visually recognized from the display, the touch panel can be used for various purposes.

Among the touch panels, a resistance type touch panel and a capacitive type touch panel are widely known. The resistance type touch panel, which includes upper and lower electrode substrates, has a transparent conductive film formed on each of the upper and lower electrode substrates. The transparent conductive film of the upper electrode substrate and the transparent conductive film of the lower electrode substrate are positioned facing each other, so that the transparent conductive films contact each other when force is exerted on a single point of the upper electrode substrate. Thereby, the position at which force is exerted can be detected. The capacitive type touch panel can detect a position of the touch panel by detecting a current that flows in, for example, a transparent electrode of the touch panel when a finger or the like is brought near the touch panel.

Generally, a decorative film is adhered to a surface of the touch panel. The decorative film includes a printing layer formed in a peripheral part of the touch panel serving as a decorative layer. A method for manufacturing a touch panel adhered with the decorative film is described with reference to FIGS. 1 and 2.

The structure of the touch panel illustrated in FIG. 1 includes a touch panel body 910 and a decorative film 930 that are adhered to each other by way of an OCA (Optically Clear Adhesive) 920. The decorative film 930 includes a transparent substrate 931 and a decorative layer 932 formed on a surface of a peripheral area of the transparent substrate 931. The decorative layer 932 may be formed with, for example, a coating that prevents light from transmitting therethrough. Further, a flexible printed circuit (FPC) 911 is connected to the touch panel body 910 for transmitting electric signals or the like.

In a case of manufacturing the touch panel having the structure illustrated in FIG. 1, the OCA 920 is to be adhered on the decorative film 930 as illustrated in FIG. 2A. A notch 920a is provided in the OCA 920 for preventing the FPC 911 from adhering to the OCA 920.

Then, as illustrated in FIG. 2B, the OCA 920 and the decorative film 930 are adhered to each other. Thereby, the touch panel having the structure illustrated in FIG. 1 is manufactured.

FIG. 3 is an top plan view observed from a direction of viewing the touch panel manufactured as described above. The process drawings of FIGS. 2A and 2B are cross-sectional views taken along a double-dot dash line of FIG. 3.

[Patent Document 1]: Japanese Laid-Open Patent Publication No. 2012-203514

With the above-described method for manufacturing a touch panel, the notch 920a is to be formed in the OCA 920. Therefore, the above-described method requires a process of forming the notch 920a and a mold for forming the notch 920a. This leads to increase of manufacturing cost. In a case where the notch 920a is not formed in the OCA 920, the FPC 911 connected to the touch panel body 910 may adhere to the OCA 920. Thus, in a case where thermal expansion occurs in the touch panel body 910 and the decorative film 930 in a state where the FPC 911 is adhered to the OCA 920, stress is generated by the thermal expansion difference between the touch panel body 910 and the decorative film 930. The stress may cause the FPC 911 to peel from the touch panel body 910 and lead to failure and malfunction.

Further, in a case where the decorative layer 931 of the decorative film 930 is thick, rugged (convex-concave) areas may be formed on the surface of the OCA 920 adhered to the decorative film 930. This may cause difficulty in neatly adhering the touch panel body 910 to the decorative film 930 and adversely affect the appearance of the touch panel. Further, if the OCA 920 protrudes from the touch panel body 910 or the decorative film 930, dust or the like may adhere to the protruding part of the OCA 920. Such dust or the like not only degrades the appearance of the touch panel but also degrades the yield of the touch panel.

SUMMARY

According to an aspect of the invention, there is provided a method for manufacturing a touch panel that includes applying a UV (ultraviolet) curing resin on a surface of a decorative film, forming a peripheral curing area by curing a peripheral area of the decorative film by radiating a UV light thereto, placing a touch panel body on the UV curing resin after the forming of the peripheral curing area, and forming an inner curing area by curing the UV curing resin by radiating the UV light thereto and adhering the decorative film and the touch panel body to each other at the inner curing area.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

DESCRIPTION OF EMBODIMENTS

Figure 1:
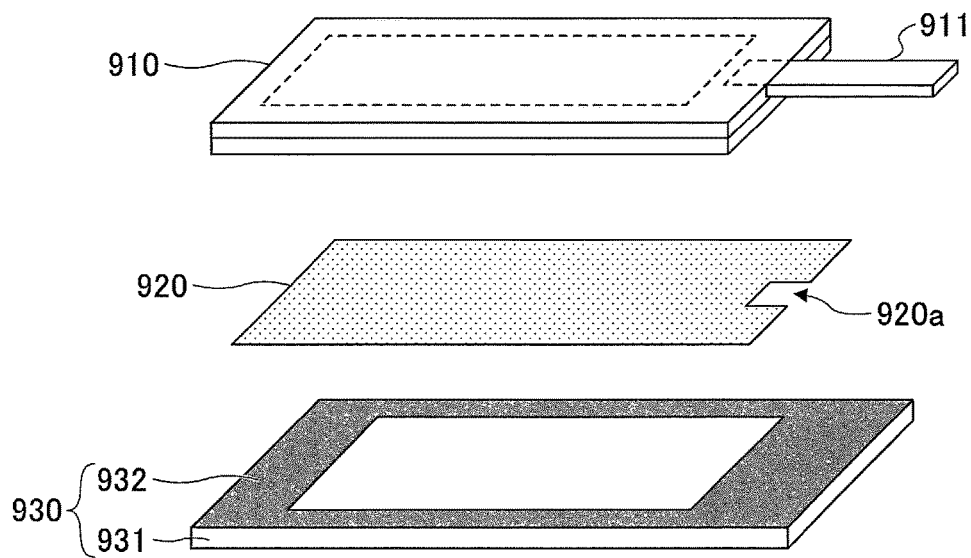
FIG. 1 is a diagram for describing a structure of a touch panel adhered with a decorative film.
Figure 2A:
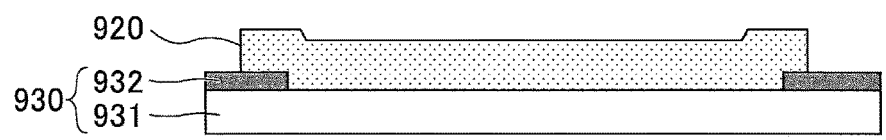
FIGS. 2A-2B are process diagrams of a method for manufacturing a touch panel adhered with a decorative film.
Figure 2B:
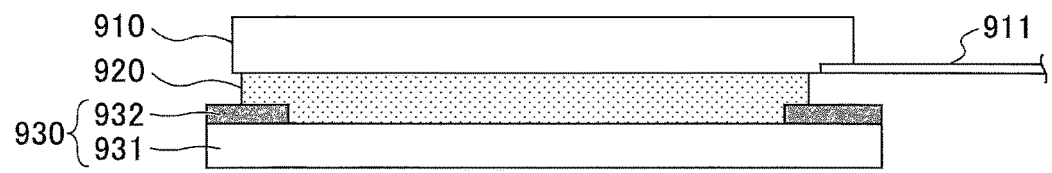
Figure 3:
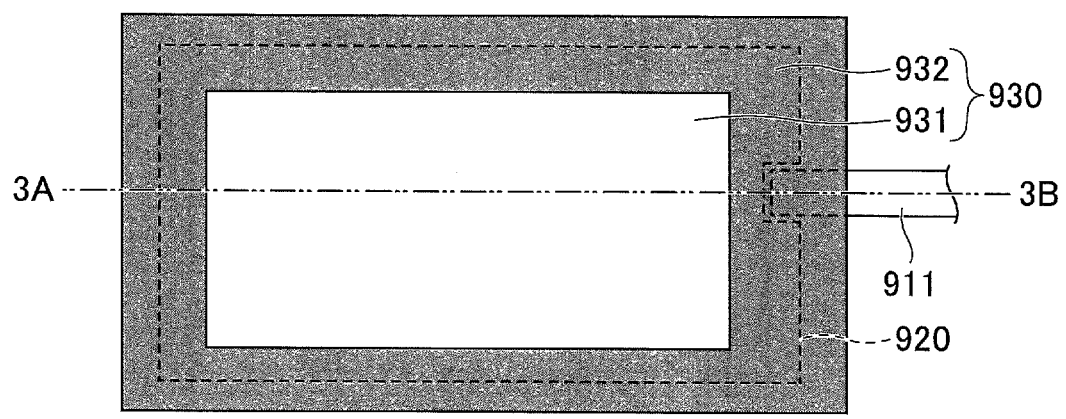
FIG. 3 is a top plan view of a touch panel adhered with a decorative film.

In the following, embodiments of the present invention will be described with reference to the accompanying drawings.

Throughout the drawings, like components and parts are denoted with like reference numerals and redundant description may be omitted where appropriate.

A method for manufacturing a touch panel according to an embodiment of the present invention is described with reference to FIG. 4.

Figure 4A:
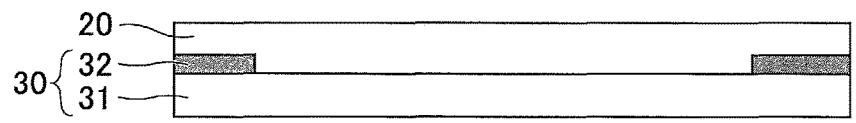
FIGS. 4A-4C are process diagrams of a method for manufacturing a touch panel according to an embodiment of the present invention.

As illustrated in FIG. 4A, a UV (ultraviolet) curing resin 20 is applied on a surface of a decorative film 30 on which a decorative layer 32 is formed. The decorative layer 32 is formed on a peripheral area of the surface of a transparent substrate 31 by applying black paint or the like on the transparent substrate 31. The transparent substrate 31 may be formed of, for example, PET (Polyethylene Terephthalate) having a thickness of 120 μm to 180 μm. The UV curing resin 20 applied on the decorative film 30 has a thickness of 50 μm to 100 μm.

Figure 4B:
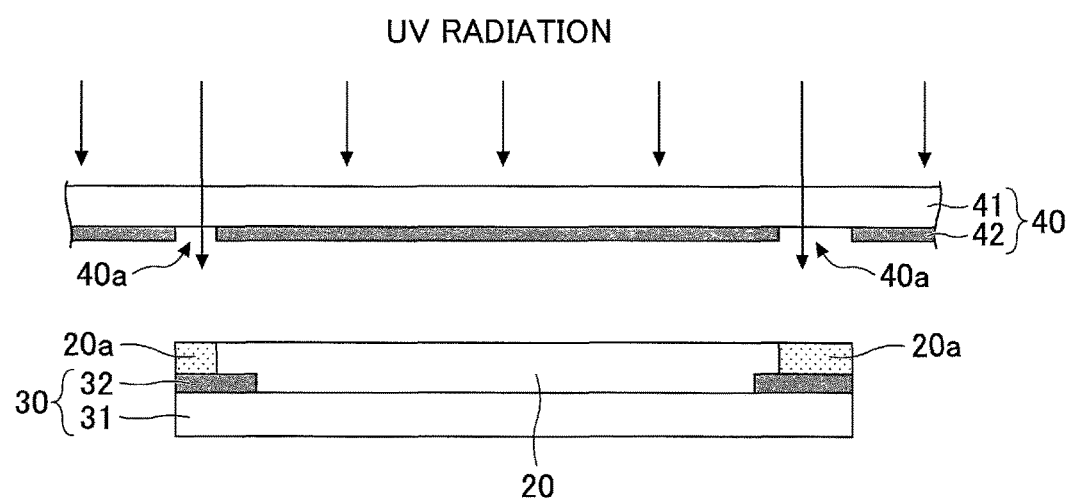

Then, as illustrated in FIG. 4B, a peripheral curing area 20a is formed on a peripheral part of a surface of the decorative layer 32 of the decorative film 30. The peripheral curing area 20a is cured by radiating UV light thereto (UV radiation) to a peripheral part of the UV curing resin 20. In this embodiment, this process may be referred to as "first UV radiation". More specifically, the peripheral curing area 20a in the UV curing resin 20 is cured by UV radiation using a mask 40 that has an opening 40a formed in a part through which UV light is to be transmitted. The mask 40 includes a transparent substrate 41 formed of a transparent glass or the like, and a light shielding part 42 formed of chrome or the like on the surface of the transparent substrate 41. The opening 40a is formed as an area of the mask 40 that does not have the light shielding part 42 formed thereon. The opening 40a is formed in a part of the mask 40 in correspondence with the peripheral area of the decorative film 30. By setting the mask 40 in a predetermined position, a particular peripheral area of the decorative film 30 can be radiated by UV light.

The peripheral curing area 20a is preferred to be formed on a part of the decorative film 30 on which the decorative layer 32 is formed. This is because even in a case where streaks or the like are formed in a boundary between an area cured in the below-described second UV curing process and another area, the appearance of the touch panel would not be adversely affected by the streaks or the like if the peripheral curing areas 20a is formed in an area covered by the decorative layer 32.

Figure 4C:
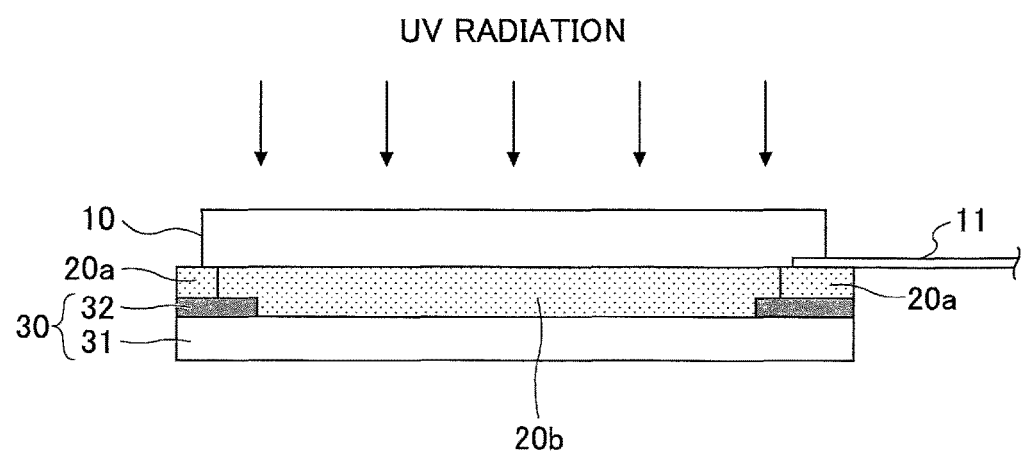

Then, as illustrated in FIG. 4C, a touch panel body 10 is placed on the UV curing resin 20 and UV light is radiated. As a result, a part of the UV curing resin 20 that was not cured in the first UV radiation is cured and an inner curing area 20b is formed inside the surface of the decorative film 30 on which the decorative layer 32 is formed. By curing the inner curing area 20b of the UV curing resin 20, the touch panel body 10 and the decorative film 30 can be adhered to each other. In adhering the touch panel body 10 and the decorative film 30, a flexible substrate 11 connected to the touch panel body 10 is placed on the peripheral curing area 20a that is already cured. Therefore, the flexible substrate 11 is not adhered to the UV curing resin 20. In this embodiment, the UV radiation of FIG. 4C may be referred to as "second UV radiation".

Figure 5:
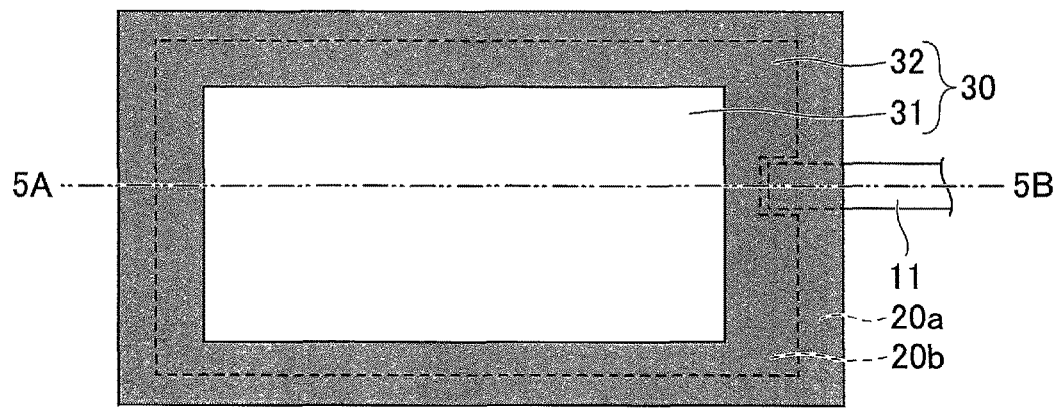
FIG. 5 is a top plan view of a touch panel according to an embodiment of the present invention.

Hence, with the method of the above-described embodiment, a touch panel can be manufactured. FIG. 5 is a top plan view observed from a direction of viewing the touch panel manufactured as described above in FIGS. 4A-4C. The process drawings of FIGS. 4A and 4C are cross-sectional views taken along a double-dot dash line of FIG. 5.

With the touch panel manufactured by the method of the above-described embodiment, even in a case where thermal expansion occurs in the touch panel body 10 and the decorative film 30, the flexible substrate 11 can be prevented from being affected by the stress caused by a difference of thermal expansion between the touch panel body 10 and the decorative film 30. Thus, the flexible substrate 11 can be prevented from peeling from the touch panel body 10.

Further, because the peripheral curing area 20a is formed by curing a peripheral part of the UV curing resin 20 in the first UV process, an uncured part of the UV curing resin 20 is surrounded by a cured peripheral curing resin 20a of the UV resin 20. Therefore, even when the touch panel body 10 is placed on the uncured part of the UV curing resin 20, the uncured UV curing resin 20 can be prevented from flowing out beyond the peripheral curing area 20a. Thus, degrading of the appearance of the touch panel and loss of yield can be prevented.

Although a UV curing resin is used as the material of the UV curing resin 20 in the above-described embodiment, a resin material (e.g., acrylic type resin) having both a UV curing property and a moisture curing property may be used instead of the UV curing resin. In a case of using the resin material as the UV curing resin 20, moisture may be supplied to cure the resin material in addition to or instead of curing the resin material by UV radiation. Thereby, insufficiently cured areas of the UV curing resin 20 UV that are not radiated with UV light can also be cured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A method for manufacturing a touch panel, the method comprising:
    applying a UV (ultraviolet) curing resin on a first surface of a decorative film that has a decorative layer at an outer peripheral area;
    forming a peripheral curing area by curing the resin that is located above the decorative layer;
    placing a touch panel body on the UV curing resin that has the peripheral curing area; and
    forming an inner curing area by curing an uncured part of the UV curing resin by radiating the UV light thereto, and adhering the decorative film and the touch panel body to each other, wherein a boundary between the peripheral curing area and the inner curing area is positioned outside a radially inner-most edge of the decorative layer toward a radially outer-most edge of the decorative film.

2. The method as claimed in claim 1, wherein the flexible substrate is sandwiched between the touch panel body and the first peripheral area.

3. The method as claimed in claim 1, wherein the forming the peripheral curing area is performed by radiating a UV light thereto through a mask that has an opening with a width that has a diameter smaller than that of the decorative layer.

4. A method for manufacturing a touch panel, the method comprising:
- applying a UV (ultraviolet) curing resin on a first surface of a decorative film that has a decorative layer at an outer peripheral area;
- forming a peripheral curing area by curing the resin that is located above the decorative layer;
- placing a touch panel body on the UV curing resin that has the peripheral curing area;
- supplying moisture at an uncured part of the UV curing resin between the decorative film and the touch panel body, thereby forming an inner curing area, and adhering the decorative film and the touch panel body to each other at the inner curing area,
- wherein the UV curing resin is curable by the moisture and the UV light, and wherein a boundary between the peripheral curing area and the inner curing area is positioned outside a radially inner-most edge of the decorative layer toward a radially outer-most edge of the decorative film.

5. The method as claimed in claim 4,
- wherein the UV light is radiated to the UV curing resin via a mask including an opening that transmits the UV light therethrough,
- wherein the opening is formed in a part of mask corresponding to the peripheral curing area,
- wherein the mask includes a transparent substrate provided with a light shielding part,
- wherein the light shielding part is formed on the mask except for the part in which the opening is formed.

6. A method for manufacturing a touch panel, the method comprising:
- applying curable resin on a first surface of a substrate onto which a decorative film is formed, said decorative film having a decorative layer at an outer peripheral area;
- curing a peripheral portion of the curable resin that is located above the decorative layer, thereby forming a peripheral curing area;
- placing a touch panel body on the curable resin that is applied on the substrate in which the peripheral portion of the curable resin is cured; and
- curing an uncured part of the curable resin inside of the cured peripheral portion, thereby forming an inner curing area, wherein a boundary between the peripheral curing area and the inner curing area is positioned outside a radially inner-most edge of the decorative layer toward a radially outer-most edge of the decorative film.

7. The method as claimed in claim 6, wherein the curable resin includes at least one of a UV curable resin and a moisture curable resin.

* * * * *